United States Patent
Pawar et al.

(10) Patent No.: US 9,668,159 B1
(45) Date of Patent: May 30, 2017

(54) DYNAMIC TREATMENT OF USER EQUIPMENT RELAY

(71) Applicant: Sprint Spectrum LP, Overland Park, KS (US)

(72) Inventors: Hemanth Pawar, Brambleton, VA (US); Chunmei Liu, Great Falls, VA (US); Krishna Sitaram, Chantilly, VA (US); Pratik Kothari, Sterling, VA (US)

(73) Assignee: Sprint Spectrum L.P., Overland Park, KS (US)

( * ) Notice: Subject to any disclaimer, the term of this patent is extended or adjusted under 35 U.S.C. 154(b) by 0 days.

(21) Appl. No.: 14/709,760

(22) Filed: May 12, 2015

(51) Int. Cl.
*H04W 28/02* (2009.01)
*H04W 16/28* (2009.01)
*H04W 92/10* (2009.01)
*H04W 88/04* (2009.01)

(52) U.S. Cl.
CPC ....... *H04W 28/0205* (2013.01); *H04W 16/28* (2013.01); *H04W 88/04* (2013.01); *H04W 92/10* (2013.01)

(58) Field of Classification Search
CPC . H04W 16/28; H04W 28/0205; H04W 88/04; H04W 92/10

USPC ......... 455/7–11.1, 14–25; 370/315
See application file for complete search history.

(56) References Cited

U.S. PATENT DOCUMENTS

| | | | |
|---|---|---|---|
| 8,446,856 B2 | 5/2013 | Womack et al. | |
| 8,989,078 B2* | 3/2015 | Kwon | H04B 7/022 370/311 |
| 2008/0108355 A1* | 5/2008 | Oleszcsuk | H04W 72/1263 455/442 |
| 2011/0159801 A1* | 6/2011 | Maltsev | H04W 52/10 455/7 |
| 2012/0082088 A1 | 4/2012 | Dalsgaard et al. | |
| 2012/0106404 A1 | 5/2012 | Damnjanovic | |
| 2012/0140699 A1* | 6/2012 | Seo | H04W 72/1252 370/315 |
| 2012/0320818 A1 | 12/2012 | Yang et al. | |
| 2013/0016649 A1* | 1/2013 | Damnjanovic | H04W 88/04 370/315 |
| 2013/0070664 A1* | 3/2013 | Nagata | H04B 7/15542 370/315 |
| 2013/0188552 A1 | 7/2013 | Kazmi et al. | |

* cited by examiner

*Primary Examiner* — Raymond Dean

(57) ABSTRACT

When a wireless device is configured to function as a relay for a donor access node, the donor access node is configured such that the relaying wireless device is given preferential treatment when compared to non-relaying wireless devices. The communication network and/or donor access node can be configured to provide improved RF conditions, higher throughput, lower latency, etc. to a relaying wireless device than is provided to non-relay wireless devices.

16 Claims, 6 Drawing Sheets

DYNAMIC TREATMENT OF USER EQUIPMENT RELAY

TECHNICAL BACKGROUND

Wireless communication networks are widely deployed to provide communication services to both fixed and mobile devices. These services can include voice, data, video, messaging, web browsing, etc. Wireless communication has certain advantages, such as mobility, over wired communications for accessing a network. Various wireless standards have been adopted or proposed for wireless networks. These standards include 802.11 (WiFi), 802.16 (WiMAX), TIA-856 (which is also known as Evolution-Data Optimized—EV-DO), and long term evolution (LTE). Additional standards such as the fourth generation communication system (4G) are also being pursued.

Because of transmit power regulations, interference, and/or radio wave propagation characteristics, a base station may be unable to provide some wireless devices (a.k.a., user equipment—UE) with coverage and/or a desired level of service (e.g., throughput, packet loss, etc.). One approach to improving coverage and/or service, particularly to user equipment near the edge of, or outside of, a base station's direct coverage area is to relay communication between the base station and a wireless device via another wireless device. Relaying by a wireless device may also be used in crowded areas to improve coverage and/or service. Relaying in an area where there is a high number of other wireless devices is used to increase the available throughput to the wireless devices being relayed. However, the relaying wireless device may not be provided with enough resources, or the right type of resources, (e.g., scheduling priority, air-interface allocations, backhaul throughput, etc.) by the donor access node to adequately service the other wireless device being relayed.

OVERVIEW

In an embodiment, a method of operating a communication system includes a first user equipment (UE) communicating with a donor access node via a first wireless link. A second UE is also communicating with the donor access node via a second wireless link. It is determined that the first user equipment is configured as a relay for a donor access node. Based on the first UE being configured as a relay, the donor access node is configured to provide the first UE with network conditions that are improved over the second UE which is not configured as a relay.

In an embodiment, a communication system comprises a donor access node. This donor access node is configured to establish a first wireless link with a first user equipment (UE) and a second wireless link with a second UE. A processor determines that the first UE is configured to relay for the donor access node. Based on the first UE being configured to relay for the donor access node, the donor access node is configured to provide the first UE with better network conditions than the second UE.

In an embodiment, a method of operating a communication system includes establishing a first wireless link between a first user equipment (UE) and a donor access node. A second wireless link between a second UE and the donor access node is also established. The first UE is determined to be configured as a relay for the donor access node. Based on the first UE being configured as a relay for the donor access node, the donor access node is configured to set at least one network parameter that gives traffic associated with the first UE better network performance than traffic associated with the second UE.

DETAILED DESCRIPTION

An access node may be servicing several wireless devices that are experiencing similar air-interface conditions (e.g., received signal strength—RSSI, reference signal received power—RSRP, signal to interference and noise ratio—SINR, and/or modulation and coding scheme—MCS, etc.). One or more of these wireless devices may also have been selected to relay communication between the access node and other wireless devices. A relay wireless device, however, may not receive enough resources, or be given enough priority by the access node to effectively improve the service and/or network conditions of the other wireless devices being relayed.

In an embodiment, when a wireless device is configured to function as a relay for a donor access node, the donor access node is configured such that wireless device receives preferential treatment (as compared to non-relaying wireless devices.) For example, because of its status as a relay, a wireless device that conventionally would not be selected to use carrier aggregation may be allowed to use carrier aggregation. In another example, when the wireless device is functioning as a relay, the donor access node may enable beamforming towards the relaying wireless device under conditions that would otherwise not warrant the use of beamforming. Likewise, based on its configuration as a relay, a relaying wireless device may be selected for higher air-interface scheduling priority, higher network throughput, higher packet priority, or the like, than a non-relaying device is given.

Figure 1:
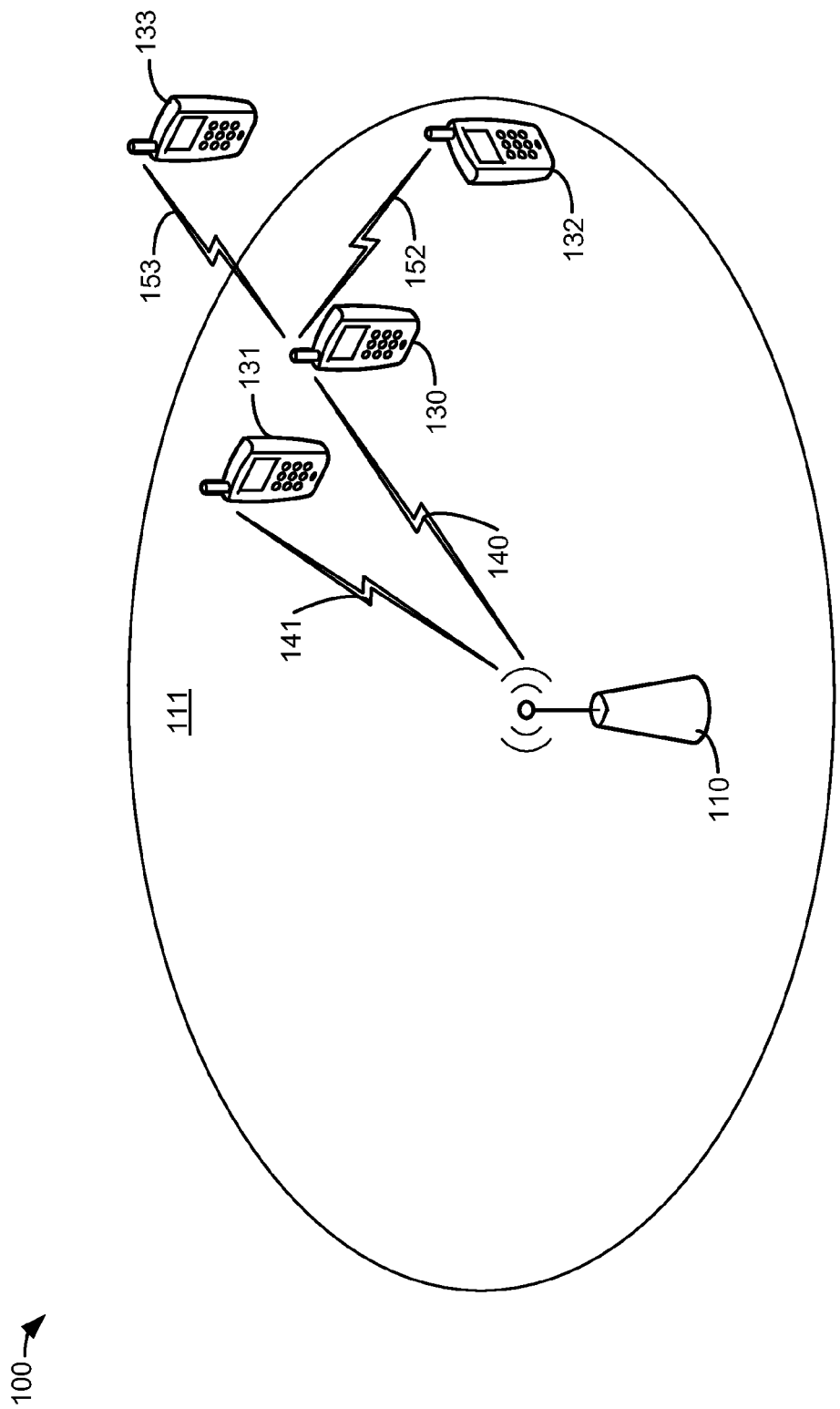
FIG. 1 is a block diagram of a communication system with user equipment relay.

FIG. 1 is block diagram illustrating a communication system with user equipment relay. In FIG. 1, communication system 100 comprises access node 110, wireless device 130, wireless device 131, wireless device 132, and wireless device 133. A wireless device 130-133 each may also be referred to as user equipment, or UE. Access node 110 is illustrated as having coverage area 111. Wireless device 130, wireless device 131, and wireless device 132 are located within coverage area 111. Wireless device 133 is located outside coverage area 111.

Access node 110 is illustrated as being operatively coupled to wireless device 130 via wireless link 140. Access node 110 is illustrated as being operatively coupled to wireless device 131 via wireless link 141. Thus, it should be understood that access node 110 has established direct (i.e., non-relayed) wireless links to wireless device 130 and wireless device 131. When a wireless device 130 in communication with access node 110 is acting as a relay, access node 110 may be referred to as a donor access node.

Wireless device 130 is also illustrated as being operatively coupled to wireless device 132 via wireless link 152. Wireless device 133 is also illustrated as being operatively coupled to wireless device 133 via wireless link 153. Thus, wireless device 130 is functioning as a relay for communication between access node 110 and wireless device 132. Wireless device 130 is also functioning as a relay for communication between access node 110 and wireless device 132.

Access node 110 is a network node capable of providing wireless communication to wireless device 130, wireless device 131, wireless device 132, and/or wireless device 133. Access node 110 can be, for example, one or more of a base transceiver station, a radio base station, an eNodeB device, or an enhanced eNodeB device.

Communication system 100 is a communication network that can provide wireless communication to wireless device 130, wireless device 131, wireless device 132, and/or wireless device 133. Communication system 100 can comprise wired and/or wireless communication networks that include processing nodes, routers, gateways, physical and/or wireless data links for carrying data among various network elements, including combinations thereof, and can include a local area network, a wide area network, and an internetwork (including the Internet). Communication system 100 can also comprise wireless networks, including base station, wireless communication nodes, telephony switches, internet routers, network gateways, computer systems, communication links, or some other type of communication equipment, and combinations thereof.

Wired network protocols that may be utilized by communication system 100 may comprise Ethernet, Fast Ethernet, Gigabit Ethernet, Local Talk (such as Carrier Sense Multiple Access with Collision Avoidance), Token Ring, Fiber Distributed Data Interface (FDDI), and Asynchronous Transfer Mode (ATM). Wireless network protocols that may be utilized by communication system 100 may comprise code division multiple access (CDMA) 1xRTT, Global System for Mobile communications (GSM), Universal Mobile Telecommunications System (UMTS), High-Speed Packet Access (HSPA), Evolution Data Optimized (EV-DO), EV-DO rev. A, Third Generation Partnership Project Long Term Evolution (3GPP LTE), and Worldwide Interoperability for Microwave Access (WiMAX).

Links between elements of communication system 100, can be, for example, twisted pair cable, coaxial cable or fiber optic cable, or combinations thereof. Wireless link 140, wireless link 141, wireless link 152, and/or wireless link 153 can be a radio frequency, microwave, infrared, or other similar signal. Wireless link 140, wireless link 141, wireless link 152, and/or wireless link 153 can use a suitable communication protocol, for example, Global System for Mobile telecommunications (GSM), Code Division Multiple Access (CDMA), Worldwide Interoperability for Microwave Access (WiMAX), or Long Term Evolution (LTE), or combinations thereof. Other wireless protocols can also be used.

Other network elements may be present in communication system 100 to facilitate wireless communication to/from access node 110, wireless device 130, wireless device 131, wireless device 132, and/or wireless device 133, but are omitted for clarity, such as base stations, base station controllers, gateways, mobile switching centers, dispatch application processors, and location registers such as a home location register or visitor location register. Furthermore, other network elements may be present to facilitate communication between among elements of communication system 100 which are omitted for clarity, including additional processing nodes, routers, gateways, and physical and/or wireless data links for carrying data among the various network elements.

Wireless device 130, wireless device 131, wireless device 132, and/or wireless device 133 may be any device, system, combination of devices, or other such communication platform capable of communicating wirelessly with access node 110. Wireless device 130 may be any device, system, combination of devices, or other such communication platform capable of functioning as a relay with access node 110 functioning as a donor access node. Wireless device 132 and wireless device 133 may be any device, system, combination of devices, or other such communication platform capable of using wireless device 130 or wireless device 131 as a relay when access node 110 functioning as a donor.

Wireless device 130, wireless device 131, wireless device 132, and/or wireless device 133 may be, for example, a mobile phone, a wireless phone, a wireless modem, a personal digital assistant (PDA), a voice over internet protocol (VoIP) phone, a voice over packet (VOP) phone, or a soft phone, as well as other types of devices or systems that can exchange audio or data via access node 110. Other types of communication platforms are possible.

In an embodiment, wireless device 130 and wireless device 131 can be configured to function as relays. In an embodiment, wireless device 130 and/or wireless device 131 can be configured to function as one or more of a layer 1 (L1), layer 2 (L2), or layer 3 (L3) relay. A layer 1 relay functions as a booster or repeater. In other words, a layer 1 relay device performs an amplify and forward (AF) function. RF signals received from access node 110 are amplified and transmitted by the relaying device (i.e., wireless device 130 and/or wireless device 131) to the device being relayed (i.e., wireless device 132 and/or wireless device 133). Likewise, RF signals received from the device(s) being relayed (i.e, wireless device 132 and/or wireless device 133) are amplified and transmitted by the relaying device (i.e., wireless device 130 and/or wireless device 131) to access node 110.

A layer 2 relay device performs a decode and forward (DF) function. RF signals received from access node 110 are demodulated and decoded, then encoded and modulated again before being transmitted by the relaying device (i.e., wireless device 130 and/or wireless device 131) to the device being relayed (i.e, wireless device 132 and/or wireless device 133). Likewise, RF signals received from the device(s) being relayed (i.e, wireless device 132 and/or wireless device 133) are demodulated and decoded, then encoded and modulated again before being transmitted by the relaying device (i.e., wireless device 130 and/or wireless device 131) to access node 110.

A layer 3 relay device also performs a decode and forward function. However, a layer 3 relay device also performs additional processing (such as ciphering and/or data concatenation/segmentation/reassembly) In other words, the relaying device (i.e., wireless device 130 and/or wireless device 131) performs demodulation and decoding of the received RF signals (either uplink or downlink), processes received data, then encodes, modulates, and transmits the data to the device(s) being relayed (i.e, wireless device 132 and/or wireless device 133 for the downlink, and access node 110 for the uplink).

In an embodiment, communication system 100 (or access node 110, in particular) determines that wireless device 130 is configured to function as a relay for access node 110. Based on wireless device 130 being configured to function as a relay, access node 110 is configured to provide wireless device 130 with preferential treatment when compared with wireless device 131—which is not functioning as a relay. This preferential treatment may involve providing wireless device 130 with network conditions that are improved over wireless device 131. For example, beamforming may be enabled for wireless device 130 but not for wireless device 131. Beamforming may be implemented for wireless device 130 under conditions that would not conventionally result in beamforming for wireless device 130 had wireless device 130 not been configured as a relay.

Beamforming may be accomplished using a plurality of antennas at access node 110 that implement, for example, a multiple input multiple output (MIMO) protocol. The signals from each of the plurality of antennas may be controlled such that the net signal from the access node 110 may be transmitted towards wireless device 130 as a beam formed signal. In an embodiment, the beam may be formed by weighing the magnitude and/or phase of the signals transmitted by each individual antenna. For example, the signals may be weighed such that the emitted waveform from the antennas experiences constructive interference in the direction of wireless device 130 and destructive interference in other directions (e.g., away from wireless device 130.)

In another example, carrier aggregation may be enabled for wireless device 130 but not for wireless device 131. Carrier aggregation may be enabled for wireless device 130 under conditions that would not conventionally result in the enablement of carrier aggregation for wireless device 130 had wireless device 130 not been configured as a relay. Carrier aggregation uses multiple RF carriers such that the data rate (or throughput) for the communication is greater than the data rate for single carrier communication. In an embodiment, access node 110 may communicate with wireless device 330 using a primary component carrier (e.g., a first frequency band) and one or more secondary component carriers (e.g., one or more secondary frequency bands). For example, a primary channel (e.g., 5 or 10 Mhz channel) and one or more secondary channels may be allocated for communication between access node 110 and wireless device 130, where each channel may comprise a component carrier for the communication. When using carrier aggregation, the available spectrum for communication, and thus the data rate or throughput, may increase directly with the number of secondary component carriers. The communication may leverage one or more of intra-band carrier aggregation with contiguous component carriers, intra-band carrier aggregation with non-contiguous component carriers, or inter-band carrier aggregation.

In another example, wireless device 130 may be given more air-interface resources than wireless device 131. This increase in the air-interface resources for wireless device 130 may be a result of wireless device 130 functioning as a relay. Likewise, the air-interface resources given to wireless device 131 may be reduced as compared to wireless device 130 because wireless device 131 is not functioning as a relay. The relative increase in air-interface resources provided to wireless device 130 over wireless device 131 may be provided by overriding (or replacing, re-weighting, or reconfiguring) a proportional scheduling scheme used by access node 110.

In another example, network conditions for wireless device 130 can be improved by configuring a scheduler used by access node 110 to decrease packet latency between access node 110 and wireless device 130. This packet latency can be decreased by increasing the scheduling priority assigned to wireless device 130. This can also be viewed as decreasing the scheduling priority assigned to non-relaying wireless devices 131.

In an embodiment, access node 110 is configured to establish wireless links with wireless device 130 and wireless device 131. Access node 110 determines that wireless device 130 is configured to relay communication on behalf of access node 110. Access node 110 may also determine that wireless device 131 is not configured to relay communication for access node 110. Access node 110 may determine wireless device 130 is configured as a relay based on information received from an element of communication system 100. For example, access node 110 may determine wireless device 130 is configured as a relay (and likewise that wireless device 131 is not configured as a relay) based on an indicator or other message received from wireless device 130, or another element of communication system 100.

Based on wireless device 130 being configured to relay on behalf of access node 110, access node 110 is configured to provide wireless device 130 with better network conditions than wireless device 131 (which is not relaying on behalf of access node 110). In this manner, a relaying wireless device 130 can provide better service to the relayed devices (e.g., wireless devices 132-133) than it could if it were being treated by access node 110 as if it were not relaying. In other words, since the traffic communicated with relay wireless device 130 includes traffic with multiple additional wireless devices 132-133, providing better network conditions can help improve the service experienced by the relayed wireless devices 132-133.

Providing relay wireless device 130 with better network conditions than non-relaying wireless device 131 can be accomplished in various ways (and combinations of ways). These ways include, but are not limited to: (1) enabling carrier aggregation for communication with wireless device 130 over wireless link 140 and not enabling carrier aggregation for communication with non-relaying wireless device 131 over wireless link 141; (2) implementing beamforming for wireless link 140 (i.e., for communication with wireless device 130) and not implementing beamforming for wireless link 141 (i.e., for communication with wireless device 131); (3) configuring an air-interface resource scheduler used by access node 110 to provide relay wireless device 130 with a higher priority for the scheduling of air-interface resources than non-relay wireless device 131 is provided; and, (4) configuring a packet scheduler in access node 110 (or another element of communication system 100) to give packets associated with (i.e., going to/from) wireless device 130 a priority that results in those packets being scheduled earlier than packets associated with wireless device 131.

In an embodiment, access node 110 establishes wireless link 140 between access node 110 and wireless device 130. Likewise, access node 110 establishes wireless link 141 between access node 110 and wireless device 131. Communication system 100 (or access node 110, in particular) determines that wireless device 130 is configured to relay communication on behalf of access node 110 with at least one additional wireless device 132-133. Based on wireless device 130 being configured to relay on behalf of access node 110, access node 110 is configured to set at least one network parameter that gives traffic associated with wireless device 130 better network performance than traffic associated with wireless device 131 (which is not functioning to relay on behalf of access node 110).

Techniques and parameters that can give wireless device 130 better network performance include configuring at least one network parameter to enable carrier aggregation on wireless link 140 thereby increasing the throughput of traffic associated with (or passing through) wireless device 130. At least one network parameter may be configured to enable beamforming on wireless link 140 thereby increasing the throughput of traffic associated with (or passing through) wireless device 130. Network parameters may be configured to enable both carrier aggregation and beamforming on wireless link 140 thereby increasing the throughput of wireless link 140 and the throughput of traffic associated with (or passing through) wireless device 130. At least one network parameter may be configured to cause traffic traversing wireless link 140 to be allocated proportionally more air-interface resources than wireless link 141. Finally, At least one network parameter may be configured to cause traffic traversing wireless link 140 to be allocated air-interface resources earlier than air-interface resource are allocated to traffic for wireless link 141.

Figure 2:
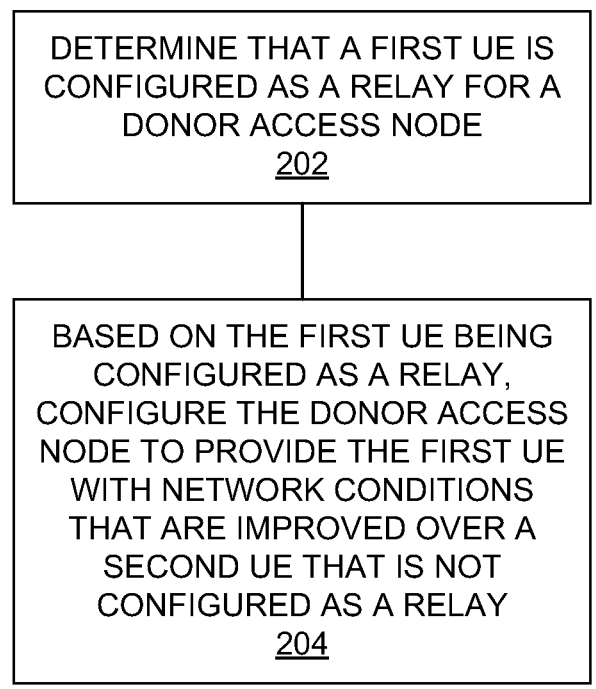
FIG. 2 is a flowchart illustrating a method of operating a communication system.

FIG. 2 is a flowchart illustrating a method of operating a communication system. The steps illustrated in FIG. 2 may be performed by one or more elements of communication system 100. A first user equipment is determined to be configured as a relay for a donor access node (202). For example, access node 110 may determine that wireless device 130 is configured to act as a relay for communication with wireless devices 132-133 on behalf of access node 110. Access node 110 may determine that wireless device 130 is configured to act as a relay in response to a message from wireless device 130, and/or messages from wireless devices 132-133.

Based on the first user equipment being configured as a relay, the donor access node is configured to provide the first user equipment with network conditions that are improved over a second user equipment that is not configured as a relay (204). For example, as a result of access node 110 determining that wireless device 130 is configured as a relay, access node 110 is configured to provide wireless device 130 with better network conditions than wireless device 131 (which is not configured as a relay). These improved network conditions may include better RF conditions (e.g., beamforming, increased power, etc.), higher throughput, greater network resource allocations (e.g., air-interface allocations, and/or wired network allocations), higher priority scheduling, lower latency scheduling, etc.

Figure 3:
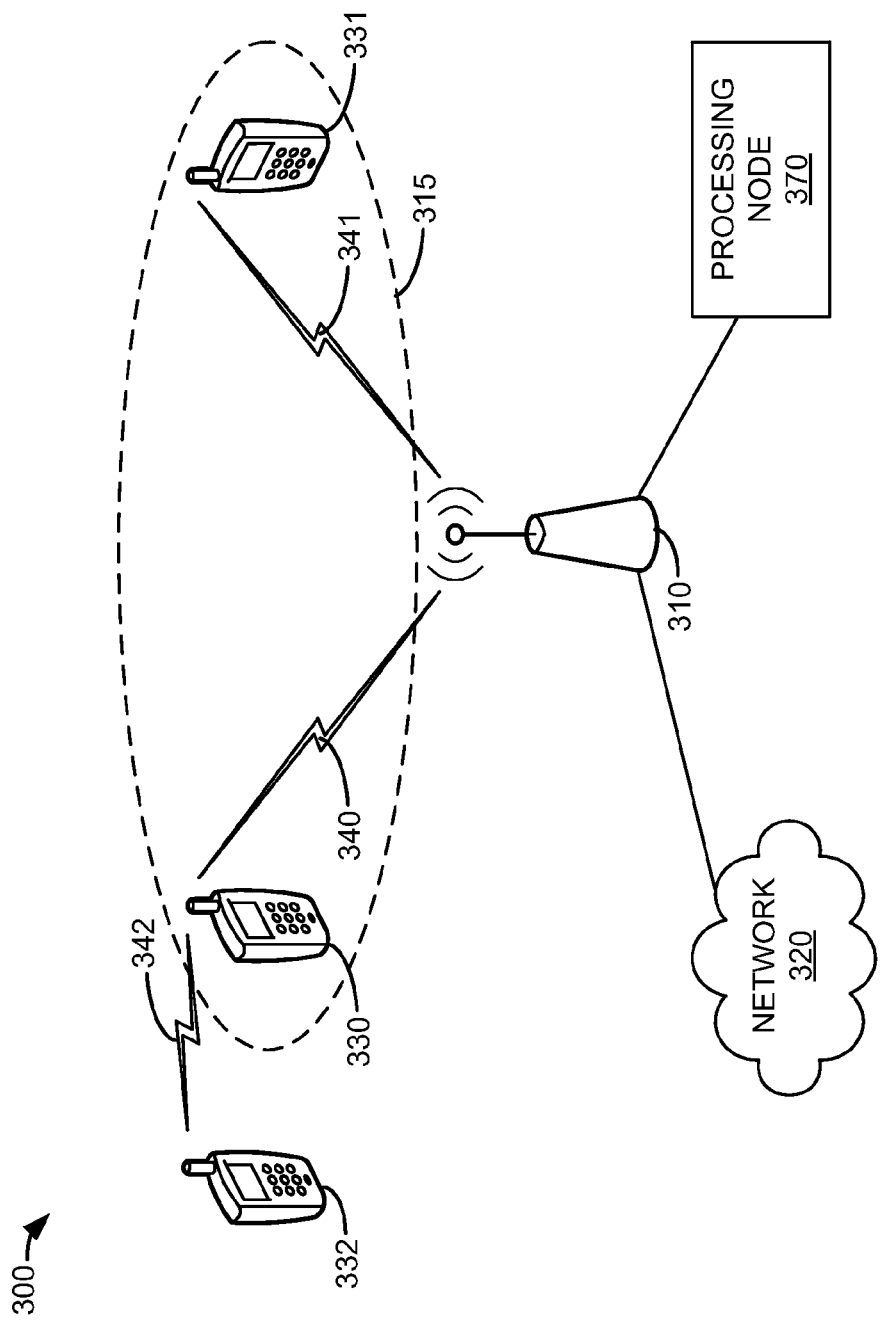
FIG. 3 is a block diagram of a communication system with preferential treatment of wireless relay devices.

FIG. 3 is a block diagram of a communication system with preferential treatment of wireless relay devices. In FIG. 3, communication system 300 comprises access node 310, network 320, wireless device 330, wireless device 331, wireless device 332, and processing node 370. Wireless device 330 and wireless device 331 may be experiencing similar air-interface (e.g., RF signal strength, MCS, CQI) conditions within area 315. Network 320 is operatively coupled to access node 310. Processing node 370 is operatively couple to (or is a part of) access node 310. Wireless device 330 is operatively coupled to access node 310 via wireless link 340. Wireless device 331 is operatively coupled to access node 310 via wireless link 341. Wireless device 332 is operatively coupled to wireless device 330 via wireless link 342.

Wireless device 330 and wireless device 331 may be any device, system, combination of devices, or other such communication platform capable of communicating with access node 310. At least wireless device 330 is capable of functioning as a relay for communication with access node 310. Wireless device 332 may be any device, system, combination of devices, or other such communication platform capable of communicating with access node 310 via wireless device 330 when wireless device 330 is configured as a relay on behalf of access node 310. Each of wireless devices 330-332 may be, for example, a mobile phone, a wireless phone, a wireless modem, a personal digital assistant (PDA), a voice over internet protocol (VoIP) phone, a voice over packet (VOP) phone, or a soft phone, as well as other types of devices or systems that can exchange data with access node 310 via wireless links. Other types of communication platforms are possible.

In an embodiment, wireless device 330 and wireless device 331 can be configured to function as relays. In an embodiment, wireless device 330 and/or wireless device 331 can be configured to function as one or more of a layer 1 (L1), layer 2 (L2), or layer 3 (L3) relay. A layer 1 relay functions as a booster or repeater. In other words, a layer 1 relay device performs an amplify and forward (AF) function. RF signals received from access node 310 are amplified and transmitted by the relaying device (i.e., wireless device 330 and/or wireless device 331) to the device being relayed (i.e., wireless device 332). Likewise, RF signals received from the device(s) being relayed (i.e., wireless device 332) are amplified and transmitted by the relaying device (i.e., wireless device 330 and/or wireless device 331) to access node 310.

A layer 2 relay device performs a decode and forward (DF) function. RF signals received from access node 310 are demodulated and decoded, then encoded and modulated again before being transmitted by the relaying device (i.e., wireless device 330 and/or wireless device 331) to the device being relayed (i.e., wireless device 332). Likewise, RF signals received from the device(s) being relayed (i.e., wireless device 332) are demodulated and decoded, then encoded and modulated again before being transmitted by the relaying device (i.e., wireless device 330 and/or wireless device 331) to access node 310.

A layer 3 relay device also performs a decode and forward function. However, a layer 3 relay device also performs additional processing (such as ciphering and/or data concatenation/segmentation/reassembly). In other words, the relaying device (i.e., wireless device 330 and/or wireless device 331) performs demodulation and decoding of the received RF signals (either uplink or downlink), processes received data, then encodes, modulates, and transmits the data to the device(s) whose transmission is being relayed.

Access node 310 may be any wireless system that can function as a donor access node and provide communication connectivity to network 320. Examples of access nodes that may be utilized include, base transceiver stations (BTSs), radio base stations (RBSs), Node B, enhanced Node B (eNBs) and others. Access nodes may include a number of elements known to those skilled in the art comprising a transceiver, power amplifier, combiner, duplexer, antenna and control function.

Network 320 can be a wired and/or wireless communication network, and can comprise processing nodes, routers, gateways, and physical and/or wireless data links for carrying data among various network elements, including combinations thereof, and can include a local area network, a wide area network, and an internetwork (including the Internet). Network 320 may also comprise a wireless network, including base stations, wireless communication nodes, telephony switches, internet routers, network gateways, computer systems, communication links, or some other type of communication equipment, and combinations thereof. Wired network protocols that may be utilized by network 320 comprise Ethernet, Fast Ethernet, Gigabit Ethernet, Local Talk (such as Carrier Sense Multiple Access with Collision Avoidance), Token Ring, Fiber Distributed Data Interface (FDDI), and Asynchronous Transfer Mode (ATM). Wireless network protocols may comprise code division multiple access (CDMA) 1×RTT, Global System for Mobile communications (GSM), Universal Mobile Telecommunications System (UMTS), High-Speed Packet Access (HSPA), Evolution Data Optimized (EV-DO), EV-DO rev. A, Third Generation Partnership Project Long Term Evolution (3GPP LTE), and Worldwide Interoperability for Microwave Access (WiMAX).

Wireless communication links can be a radio frequency, microwave, infrared, or other similar signal, and can use a suitable communication protocol, for example, Global System for Mobile telecommunications (GSM), Code Division Multiple Access (CDMA), Worldwide Interoperability for Microwave Access (WiMAX), or Long Term Evolution (LTE), or combinations thereof. Other wireless protocols can also be used.

Other network elements may be present in communication system 300 to facilitate wireless communication but are omitted for clarity, such as base stations, base station controllers, gateways, mobile switching centers, dispatch application processors, and location registers such as a home location register or visitor location register. Furthermore, other network elements may be present to facilitate communication between access node 310 and network 320 which are omitted for clarity, including additional processing nodes, routers, gateways, and physical and/or wireless data links for carrying data among the various network elements.

In an embodiment, communication system 300 (or processing node 370, in particular) determines that wireless device 330 is configured to function as a relay for access node 310. Based on wireless device 330 being configured to function as a relay, communication system 300 is configured by to provide wireless device 330 with preferential treatment when compared with wireless device 331—which is not functioning as a relay. This preferential treatment may involve providing wireless device 330 with network conditions that are improved over wireless device 331. For example, access node 310 may be configured to beamform wireless link 340 with wireless device 330 but not beamform wireless link 341 with wireless device 331. Beamforming may be enabled for wireless link 340 under conditions that would not conventionally result in beamforming the wireless link 340 with wireless device 330.

Beamforming may be accomplished using a plurality of antennas at access node 310 that implement, for example, a multiple input multiple output (MIMO) protocol. The signals from each of the plurality of antennas may be controlled such that the net signal from the access node 310 may be transmitted towards wireless device 330 as a beam formed signal. In an embodiment, the beam may be formed by weighing the magnitude and/or phase of the signals transmitted by each individual antenna. For example, the signals may be weighed such that the emitted waveform from the antennas experiences constructive interference in the direction of wireless device 330 and destructive interference in other directions (e.g., away from wireless device 330.)

In another example, carrier aggregation may be enabled by access node 310 for wireless device 330 but not for wireless device 331. Carrier aggregation may be enabled for wireless device 330 under conditions that would not conventionally use carrier aggregation. Carrier aggregation uses multiple RF carriers such that the data rate (or throughput) for the communication is greater than the data rate for single carrier communication. In an embodiment, access node 310 may communicate with wireless device 330 using a primary component carrier (e.g., a first frequency band) and one or more secondary component carriers (e.g., one or more secondary frequency bands). For example, a primary channel (e.g., 5 or 10 Mhz channel) and one or more secondary channels may be allocated for communication between access node 310 and wireless device 330, where each channel may comprise a component carrier for the communication. When using carrier aggregation, the available spectrum for communication, and thus the data rate or throughput, may increase directly with the number of secondary component carriers. The communication may leverage one or more of intra-band carrier aggregation with contiguous component carriers, intra-band carrier aggregation with non-contiguous component carriers, or inter-band carrier aggregation.

In another example, wireless device 330 may be given more air-interface resources by access node 310 than wireless device 331. This increase in the air-interface resources for wireless device 330 is in response to wireless device 330 functioning as a relay on behalf of access node 310. Air-interface resources given to wireless device 331 by access node 310 may be reduced as compared to wireless device 330 because wireless device 331 is not functioning as a relay on behalf of access node 310. The relative increase in air-interface resources provided to wireless device 330 over wireless device 331 may be provided by overriding (or replacing, re-weighting, or reconfiguring) a proportional scheduling scheme used by access node 310.

In another example, network conditions for wireless device 330 can be improved by configuring a scheduler used by access node 310 to decrease packet latency between network 320 and wireless device 330. This packet latency can be decreased by increasing the scheduling priority assigned to wireless device 330. This can also be viewed as decreasing the scheduling priority assigned to non-relaying wireless devices 331.

In an embodiment, access node 310 is configured to establish wireless links with wireless device 330 and wireless device 331. Processing node 370 determines that wireless device 330 is configured to relay communication on behalf of access node 310. Processing node 370 may also determine that wireless device 331 is not configured to relay communication for access node 310. Processing node 370 may determine wireless device 330 is configured as a relay based on information received from an element of communication system 300. For example, processing node 370 may determine wireless device 330 is configured as a relay (and likewise that wireless device 331 is not configured as a relay) based on an indicator or other message received from wireless device 330 or another element of communication system 300.

Based on wireless device 330 being configured to relay on behalf of access node 310, communication system 300 is configured to provide wireless device 330 with better network conditions than wireless device 331 (which is not relaying on behalf of access node 310). In this manner, a relaying wireless device 330 can provide better service to the relayed devices (e.g., wireless device 332) than it could if it were being treated by communication system 300 as if it were not relaying. In other words, since the traffic communicated with relay wireless device 330 includes traffic with at least one additional wireless device 332, providing better network conditions can help improve the service experienced by the relayed wireless device 332.

Providing relay wireless device 330 with better network conditions than non-relaying wireless device 331 can be accomplished in various ways (and combinations of ways). These ways include, but are not limited to: (1) enabling carrier aggregation for communication with wireless device 330 over wireless link 340 and not enabling carrier aggregation for communication with non-relaying wireless devices 331 over wireless link 341; (2) implementing beamforming for wireless link 340 (i.e., for communication with wireless device 330) and not implementing beamforming for wireless link 341 (i.e., for communication with wireless device 331); (3) configuring an air-interface resource scheduler communication system 300 to provide relay wireless device 330 with a higher priority for the scheduling of air-interface resources than non-relay wireless device 331 is provided; and, (4) configuring a packet scheduler in communication system 300 to give packets communicated with wireless device 330 a priority that results in those packets being scheduled earlier than packets associated with wireless device 331.

In an embodiment, communication system 300 establishes wireless link 340 between access node 310 and wireless device 330. Likewise, communication system 300 establishes wireless link 341 between access node 310 and wireless device 331. Processing node 370 determines that wireless device 330 is configured to relay communication on behalf of access node 310 with at least one additional wireless device 332. Based on wireless device 330 begin configured as a relay on behalf of access node 310, communication system 300 is configured to set at least one network parameter that gives traffic associated with wireless device 330 better network performance than traffic associated with wireless device 331 (which is not functioning as a relay on behalf of access node 310).

Techniques and parameters that can give wireless device 330 better network performance include configuring at least one network parameter to enable carrier aggregation on wireless link 340 thereby increasing the throughput of traffic associated with (or passing through) wireless device 330. At least one network parameter may be configured to enable beamforming on wireless link 340 thereby increasing the throughput of traffic associated with (or passing through) wireless device 330. Network parameters may be configured to enable both carrier aggregation and beamforming on wireless link 340 thereby increasing the throughput of wireless link 340 and the throughput of traffic associated with (or passing through) wireless device 330. At least one network parameter may be configured to cause traffic traversing wireless link 340 to be allocated proportionally more air-interface resources than wireless link 341. Finally, At least one network parameter may be configured to cause traffic traversing wireless link 340 to be allocated air-interface resources earlier than air-interface resource are allocated to traffic for wireless link 341.

Figure 4:
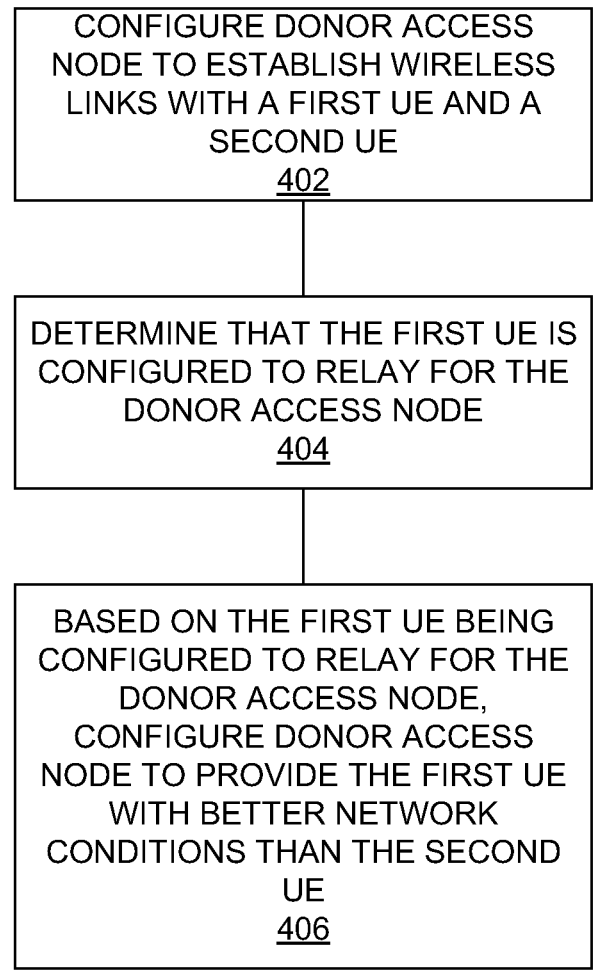
FIG. 4 is a flowchart illustrating a method of providing better network conditions.

FIG. 4 is a flowchart illustrating a method of providing better network conditions. The steps illustrated in FIG. 4 may be performed by one or more elements of communication system 100 and/or communication system 300. A donor access node is configured to establish wireless links with a first user equipment and a second user equipment (402). For example, access node 310 may be configured to establish wireless link 340 with wireless device 330 and to establish wireless link 341 with wireless device 331.

It is determined that the first user equipment is configured to relay for the donor access node (404). For example, processing node 370 may determine that wireless device 330 is configured to relay communication with wireless device 332 on behalf of access node 310. Based on the first user equipment being configured to relay for the donor access node, the donor access node is configured to provide the first user equipment with better network conditions than the second user equipment (406). For example, when processing node 370 determines that wireless device 330 is configured to act as a relay on behalf of access node 310, access node 310 is configured to provide improved RF conditions, higher throughput, lower latency, etc. to wireless device 330 than access node 310 provides to wireless device 331.

Figure 5:
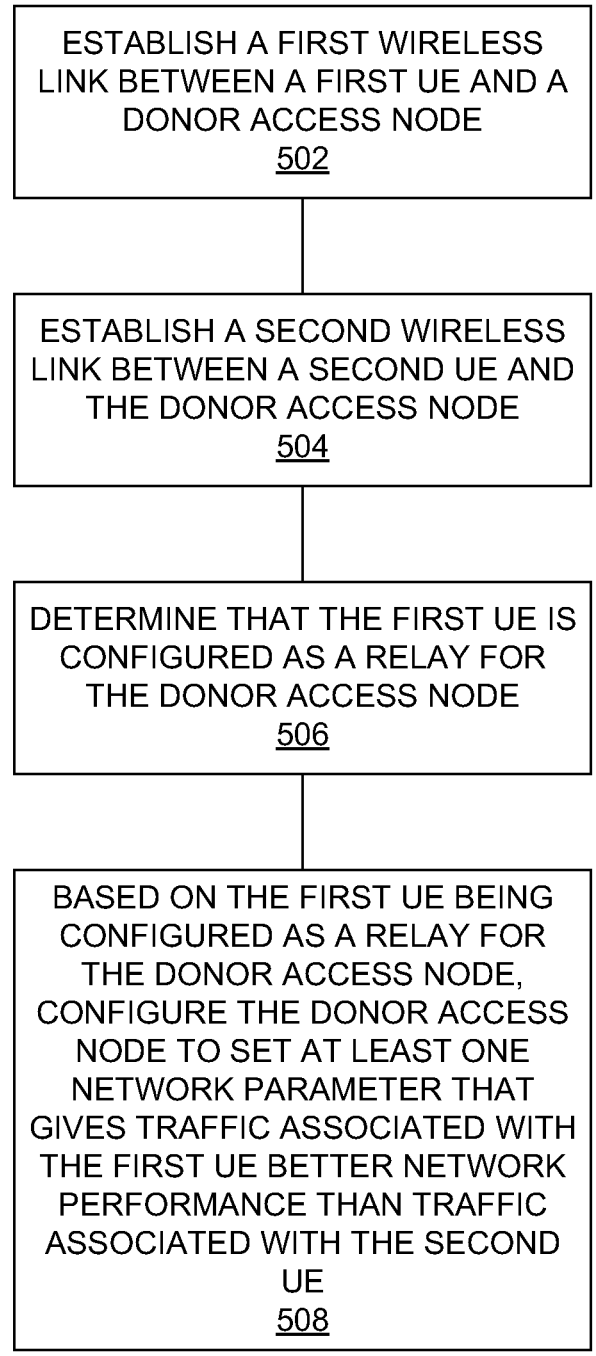
FIG. 5 is a flowchart illustrating a method of relaying traffic.

FIG. 5 is a flowchart illustrating a method of relaying traffic. The steps illustrated in FIG. 5 may be performed by one or more of communication system 100 and/or communication system 300. A first wireless link is established between a first wireless device and a donor access node (502). For example, communication system 300 may establish a wireless link 340 between wireless device 330 and access node 310. A second wireless link is established between a second wireless device and a donor access node (504). For example, communication system 300 may establish a wireless link 341 between wireless device 331 and access node 310.

The first user equipment is determined to be configured as a relay for the donor access node (506). For example, processing node 370 may determine that wireless device 330 is configured to relay communication with wireless device 332 on behalf of access node 310.

Based on the first user equipment being configured as a relay for the donor access node, the donor access node is configured to set at least one network parameter that gives traffic associated with the first user equipment better network performance than traffic associated with the second user equipment (508). For example, in response to processing node 370 determining that wireless device 330 is configured to relay communication with wireless device 332 on behalf of access node 310, access node 310 may be configured by communication system 300 to set one or more network parameters in order to give traffic associated with wireless device 330 better network performance than traffic associated with wireless device 331 is given. The one or more network parameters may be configured to provide one or more of improved RF conditions, higher throughput, lower latency, etc. to wireless device 330 than is provided to wireless device 331.

The methods, systems, devices, networks, access nodes, and equipment described above may be implemented with, contain, or be executed by one or more computer systems and/or processing nodes. The methods described above may also be stored on a non-transitory computer readable medium. Many of the elements of communication system 100 and/or communication system 300 may be, comprise, or include computers systems and/or processing nodes. This includes, but is not limited to: access node 110, wireless devices 130-133, access node 310, wireless devices 330-332, processing node 370, and/or network 320.

Figure 6:
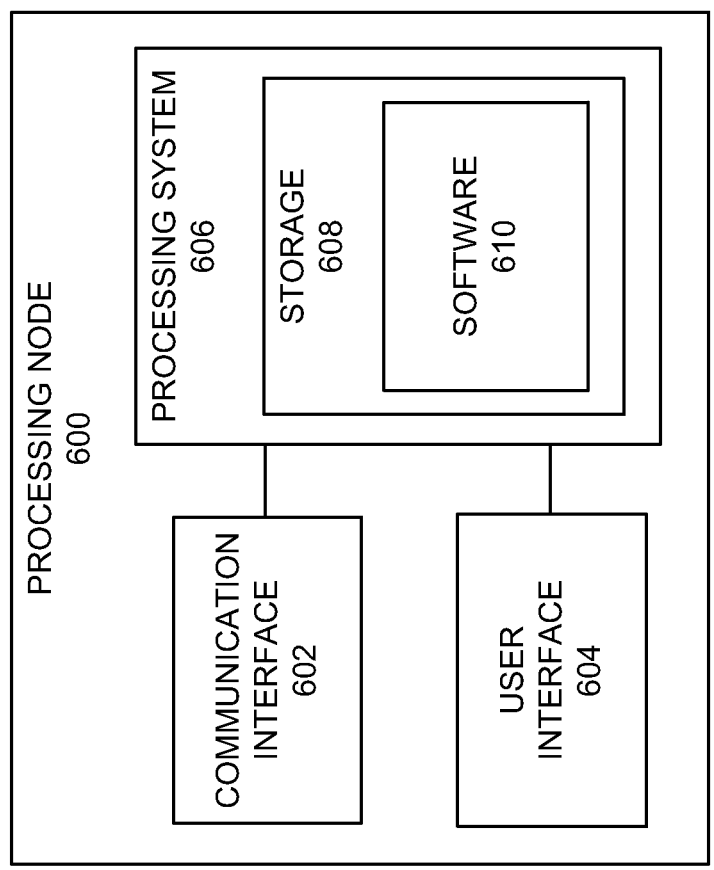
FIG. 6 illustrates a processing node.

FIG. 6 illustrates an exemplary processing node 600 comprising communication interface 602, user interface 604, and processing system 606 in communication with communication interface 602 and user interface 604. Processing node 600 is capable of paging a wireless device. Processing system 606 includes storage 608, which can comprise a disk drive, flash drive, memory circuitry, or other memory device. Storage 608 can store software 610 which is used in the operation of the processing node 600. Storage 608 may include a disk drive, flash drive, data storage circuitry, or some other memory apparatus. Software 610 may include computer programs, firmware, or some other form of machine-readable instructions, including an operating system, utilities, drivers, network interfaces, applications, or some other type of software. Processing system 606 may include a microprocessor and other circuitry to retrieve and execute software 610 from storage 608. Processing node 600 may further include other components such as a power management unit, a control interface unit, etc., which are omitted for clarity. Communication interface 602 permits processing node 600 to communicate with other network elements. User interface 604 permits the configuration and control of the operation of processing node 600.

An example of processing node 600 includes access node 110. Processing node 600 can also be an adjunct or component of a network element, such as an element of access node 110, wireless devices 130-133, access node 310, wireless devices 330-332, processing node 370, and/or network 320, a mobility management entity, a gateway, a proxy node, or another network element in a communication system.

The exemplary systems and methods described herein can be performed under the control of a processing system executing computer-readable codes embodied on a computer-readable recording medium or communication signals transmitted through a transitory medium. The computer-readable recording medium is any data storage device that can store data readable by a processing system, and includes both volatile and nonvolatile media, removable and non-removable media, and contemplates media readable by a database, a computer, and various other network devices. Examples of the computer-readable recording medium include, but are not limited to, read-only memory (ROM), random-access memory (RAM), erasable electrically programmable ROM (EEPROM), flash memory or other memory technology, holographic media or other optical disc storage, magnetic storage including magnetic tape and magnetic disk, and solid state storage devices. The computer-readable recording medium can also be distributed over network-coupled computer systems so that the computer-readable code is stored and executed in a distributed fashion. The communication signals transmitted through a transitory medium may include, for example, modulated signals transmitted through wired or wireless transmission paths.

The above description and associated figures teach the best mode of the invention. The following claims specify the scope of the invention. Note that some aspects of the best mode may not fall within the scope of the invention as specified by the claims. Those skilled in the art will appreciate that the features described above can be combined in various ways to form multiple variations of the invention. As a result, the invention is not limited to the specific embodiments described above, but only by the following claims and their equivalents.

What is claimed is:

1. A method of operating a communication system, comprising:
    determining, based on an indicator received from a first user equipment (UE), that the first UE is configured as a relay for a donor access node, the first UE communicating with the donor access node via a first wireless link; and,
    based on the first UE being configured as a relay, configuring the donor access node to implement beamforming for the first wireless link under conditions that would not otherwise warrant implementing beamforming for a second UE that is not configured as a relay, the second UE communicating with the donor access node via a second wireless link.

2. The method of claim 1, wherein the operations further comprise implementing carrier aggregation for the first wireless link.

3. The method of claim 1, wherein the operations further comprise increasing air-interface resources allocated to the first wireless link.

4. The method of claim 3, wherein air-interface resources allocated to the first wireless link are increased by overriding a proportional scheduling scheme to provide the first UE with proportionally more air-interface resources than the second UE.

5. The method of claim 1, wherein the operations further comprise configuring a scheduler for the donor access node to decrease packet latency between the donor access node and the first UE.

6. The method of claim 5, wherein the packet latency between the donor access node and the first UE is decreased by increasing a scheduling priority assigned to the first UE as compared to the second UE.

7. A communication system, comprising:
    a donor access node configured to establish a first wireless link with a first user equipment (UE) and a second wireless link with a second UE; and
    a processor configured to:
        determine, based on an indicator received from the first UE, that the first UE is configured to relay for the donor access node; and,
        based on the first UE being configured to relay for the donor access node, configure the donor access node to implement beamforming for the first wireless link under conditions that would not otherwise warrant implementing beamforming for the second UE.

8. The communication system of claim 7, wherein the donor access node is configured to enable carrier aggregation for the first wireless link and not enable carrier aggregation for the second wireless link.

9. The communication system of claim 7, wherein the donor access node is configured to give the first UE a higher priority for the scheduling of air-interface resources than the second UE is given.

10. The communication system of claim 9, wherein the higher priority for the scheduling of air-interface resources given to the first UE results in a greater throughput for the first UE than the second UE.

11. The communication system of claim 7, wherein the donor access node is configured to give packets associated with the first UE a priority to be scheduled earlier than packets associated with the second UE.

12. The communication system of claim 11, wherein the priority to be scheduled earlier results in shorter packet latency for the first UE than the second UE.

13. A method of operating a communication system, comprising:
    establishing a first wireless link between a first user equipment (UE) and a donor access node;
    establishing a second wireless link between a second UE and the donor access node;
    determining, based on an indicator received from the first UE, that the first UE is configured as a relay for the donor access node; and,
    based on the first UE being configured as a relay for the donor access node, configuring the donor access node to set at least one network parameter that implements beamforming for the first wireless link under conditions that would not otherwise warrant implementing beamforming for the second UE.

14. The method of claim 13, wherein the at least one network parameter enables carrier aggregation on the first wireless link thereby increasing throughput for the traffic associated with the first UE.

15. The method of claim 13, wherein the at least one network parameter causes traffic for the first wireless link to be allocated proportionally more air-interface resources than the second wireless link.

16. The method of claim 13, wherein the at least one network parameter causes traffic for the first wireless link to be allocated air-interface resources earlier than the second wireless link.

\* \* \* \* \*